United States Patent Office 3,085,964
Patented Apr. 16, 1963

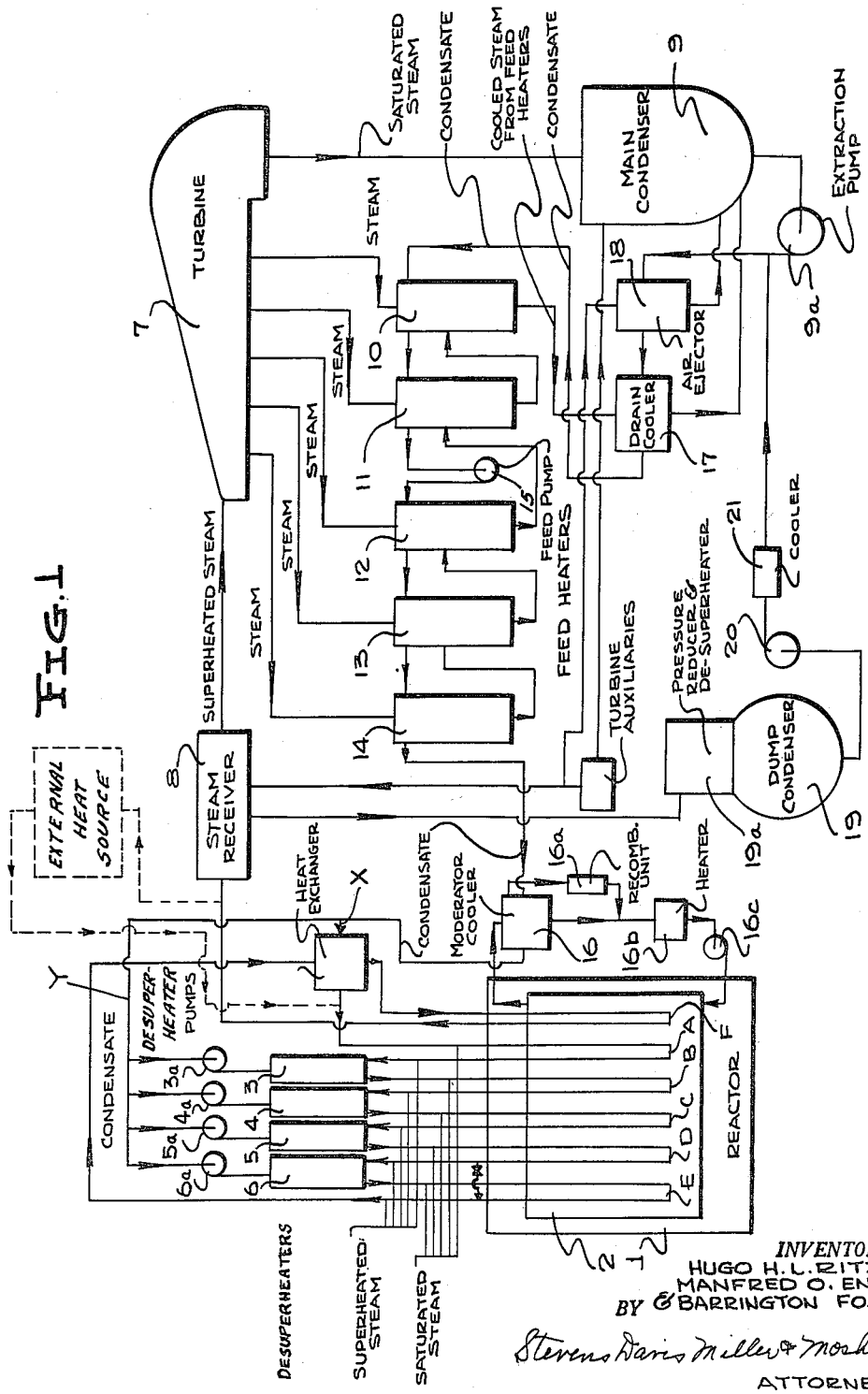

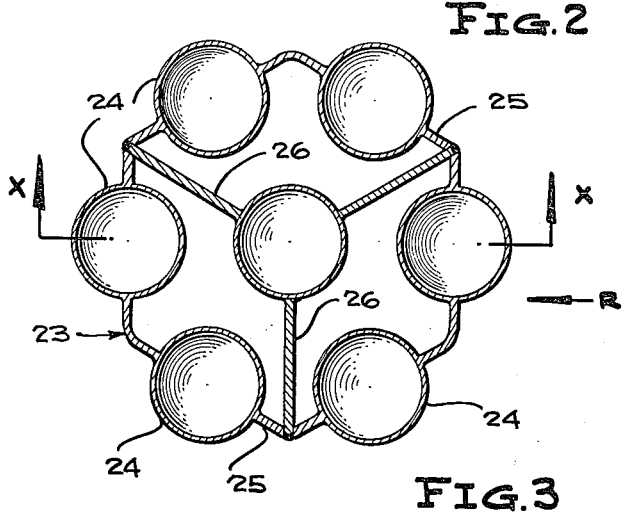
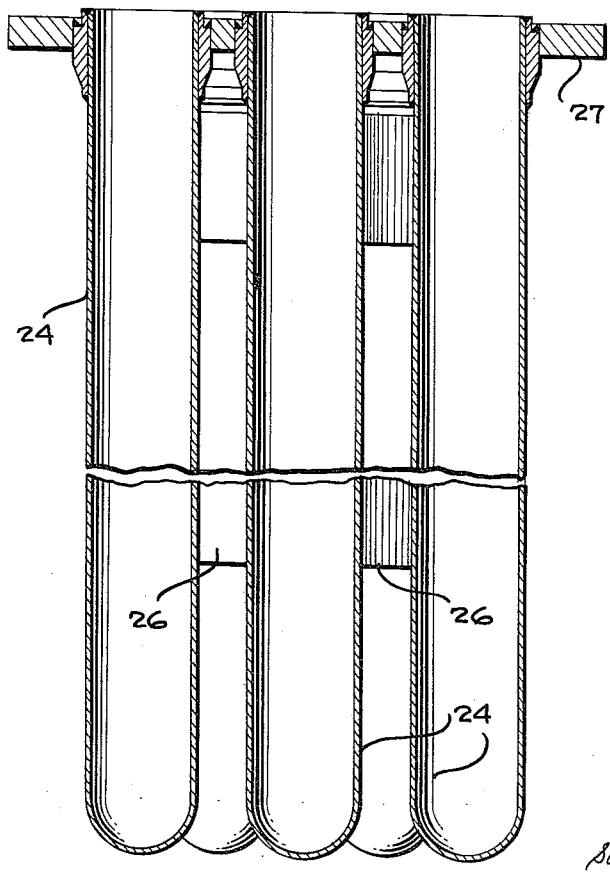
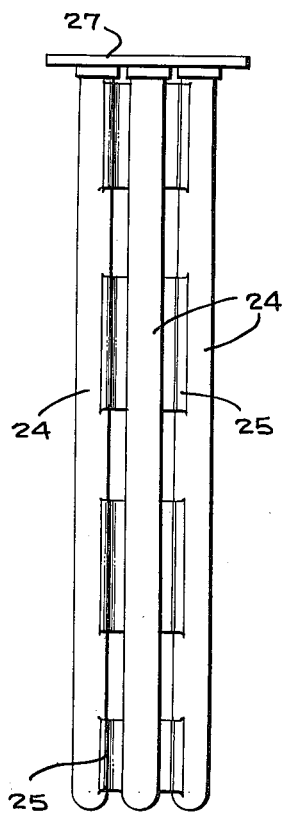

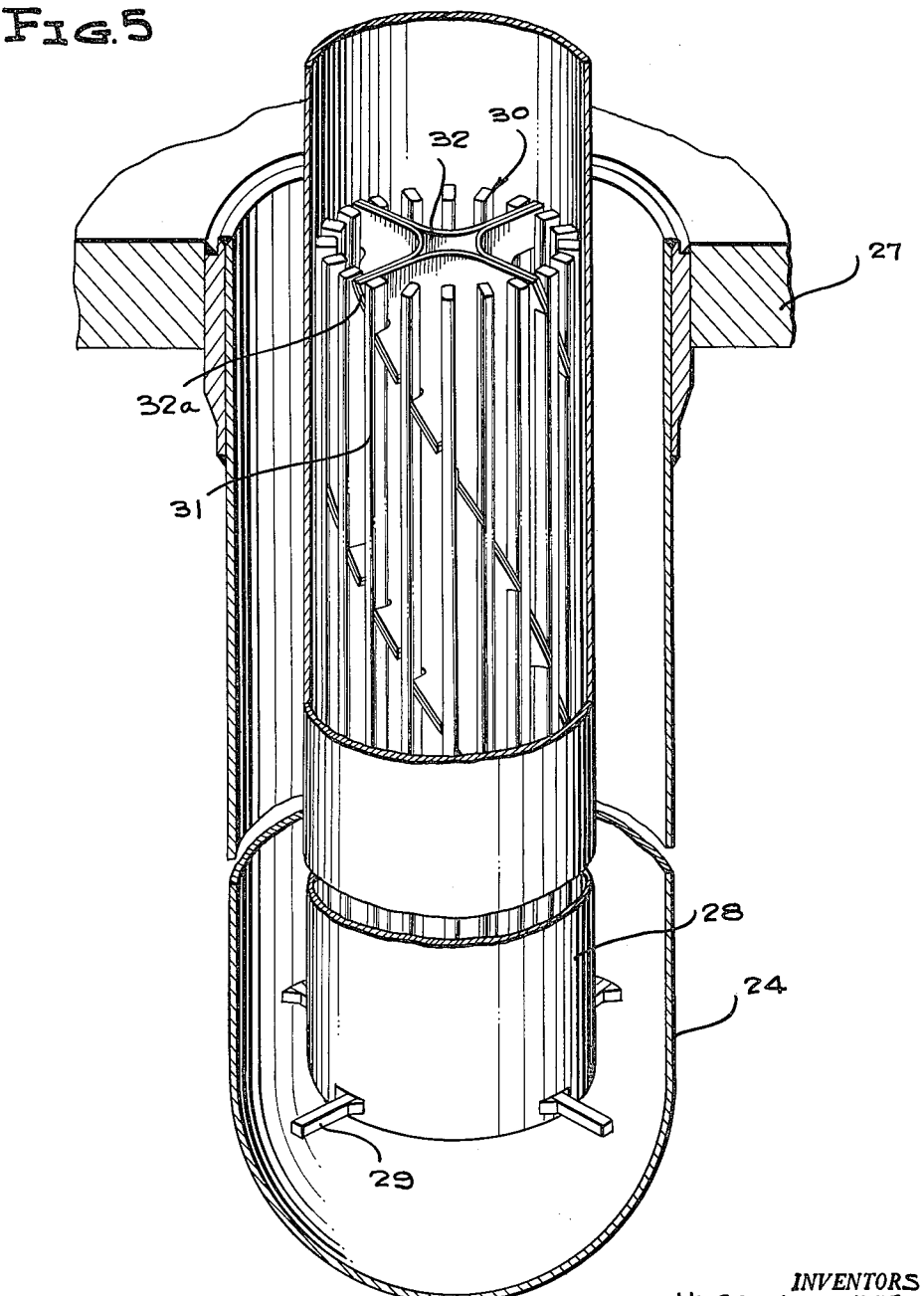

3,085,964
NUCLEAR REACTORS
Hugo Heinrich Ludolf Ritz, Manfred Otto Engel, and Barrington Forster, all of Newcastle-upon-Tyne, England, assignors to C. A. Parsons & Company Limited, Newcastle-upon-Tyne, England
Filed Oct. 28, 1959, Ser. No. 849,315
Claims priority, application Great Britain Nov. 7, 1958
6 Claims. (Cl. 204—193.2)

The present invention relates to nuclear reactors and more particularly to nuclear reactors wherein nuclear fuel is housed in closed containers located in a reactor core of neutron moderating material.

Generally, several types of nuclear reactors have been developed, one being a gas cooled graphite moderated reactor in which the reactor core consists of graphite. The graphite contains a plurality of bores in which are located closed fuel containers hereinafter referred to as fuel elements. A cooling gas, usually carbon dioxide, is circulated through the bores removing heat from the fuel elements. In the application of the reactor to power plants, the carbon dioxide passes outside the reactor to a heat exchanger where it gives up its heat to a working fluid, in most cases water, which is raised to steam and used to drive a power plant, such as a turbine. A gas cooled reactor has a number of advantages in that the gas does not absorb any appreciable quantity of neutrons and the changes in density are relatively small. The main disadvantage of this system is that heat exchangers are required outside the reactor for transferring heat from the gas to water in order to raise steam.

In another form of reactor, a liquid moderator is used utilizing heavy or light water. In certain versions of this form of reactor referred to as boiling water reactors, the fuel elements are cooled by water which is raised to the boiling point. Steam is then removed from the reactor, superheated and then passed to a turbine. Alternatively, the steam can be superheated in the reactor by passing the steam through the core to raise its temperature further. In either case, the use of large heat exchangers between the reactor and the turbine is avoided. In the first case where superheating takes place outside the reactor, the superheater is small compared with the heat exchangers used with the carbon dioxide cooled reactor. In the second case, the superheated steam is conveyed directly from the reactor to the turbine. However, the boiling water reactor has the disadvantage that evaporation takes place within the reactor core and changes in state can lead to control difficulties. In some cases boiling takes place separately outside the reactor in which superheating takes place and in this case the reactor in which superheating takes place is in effect a gas cooled reactor. Such reactors suffered from the disadvantage of conventional gas cooled reactors in that it was still necessary to provide circulating means capable of handling the full gas flow.

The object of the present invention is to provide a reactor in which the coolant is a vapor (steam) which is superheated in passing through the reactor but in which the pumping power required for the circulation of the vapor (steam) is considerably reduced.

The present invention in its preferred form comprises a nuclear reactor of the kind in which nuclear fuel is housed in closed containers and the containers are located in a reactor core of neutron moderating material, and the reactor is associated with a source utilizing the heat removed from the reactor by a coolant. The coolant is a steam which is passed through successive sections of the reactor core and superheated, and the sections of the core are connected in series with one another. A plurality of de-superheaters are provided in operative association with the core sections so that steam flowing from one section to the next passes through a de-superheater. The arrangement provides that condensed steam returning to the reactor from the source utilizing the steam heat content is divided into a number of separate streams, wherein the stream going to the first section in the reactor core is raised at least to saturated steam outside the reactor and the remaining streams of condensed steam being conveyed to the de-superheaters to be mixed with steam passing therethrough between successive sections of the reactor. The remaining streams of condensed steam cooling the vapor passing through the de-superheaters between successive sections of the reactor are in themselves converted into steam. Also, increasing amounts of condensate is added in successive de-superheaters until the steam returning to the reactor from the final de-superheater is equivalent to the full mass flow of steam circulating to the source utilizing the heat removed from the reactor by the coolant.

The invention utilizes a nuclear reactor of the kind in which nuclear fuel is housed in closed containers and the containers are located in a reactor core of neutron moderating material. The reactor is operatively associated with a source of steam consumption, in which reactor the coolant is steam which is passed through successive sections of the reactor core wherein the sections are connected in series with one another. A plurality of de-superheaters are then provided so that the steam flowing from one section of the reactor core to the next passes through a de-superheater. In this manner, the arrangement is that condensate being returned from the source of steam consumption is divided into a number of separate streams. The stream going to the first section in the reactor core is raised at least to saturated steam outside the reactor, and the remaining streams of condensate are conveyed to the de-superheaters to be mixed with steam passing therethrough between successive sections of the reactor to cool such steam and be in themselves converted to steam. Thus, increasing amounts of condensate are added in successive de-superheaters until the steam returning to the reactor from the final de-superheater is equivalent to the full mass flow of steam circulating to the source of steam consumption.

In addition, the steam leaving the section of the reactor following from the final de-superheater may be conveyed to a heat exchanger for heating the stream of condensate entering the first section of the reactor, and the steam returned to a final section of the reactor for further heating prior to being conveyed to the source of the steam consumption. The invention also comprises the use of a liquid moderator cooled by circulating it through a cooler located outside the reactor through which condensate being returned to the reactor from the turbine is circulated. In addition, if desired the liquid moderator is pressurized. Alternatively a solid graphite moderator may be used.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a diagrammatic view showing the layout of a nuclear power plant incorporating a nuclear reactor of a preferred embodiment;

FIGURE 2 is a cross-sectional view of a suitable fuel element container arrangement in the reactor of FIGURE 1;

FIGURE 3 is a sectional side view of the fuel element container arrangement;

FIGURE 4 is a side view of the fuel element container arrangement; and

FIGURE 5 is a perspective view, partly in vertical section, showing a fuel element.

In carrying the invention into effect in one form by way of example in a steam cooled reactor and referring to FIGURE 1, a reactor 1 is represented diagrammatically and has a core 2 of neutron moderating material which may be liquid, for example, heavy or light water or a solid, for example, graphite. In the present instance we shall consider a liquid moderator. Located outside the reactor are four de-superheaters 3–6 inclusive supplied with condensate by de-superheater pumps 3a, 4a, 5a and 6a respectively. Whilst four de-superheaters have been shown the invention is not limited to this number and the number used may be chosen to suit circumstances.

Superheated steam from the reactor is conveyed to turbine 7 via a steam receiver 8. Steam exhausted from turbine 7 passes to main condenser 9 where it is condensed and passed via pump 9a through feed heaters 10–14 inclusive. The latter are heated by steam bled from turbine stages. Circulation of the feed is assisted by a feed pump 15. On leaving feed heater 14 the condensate passes to moderator cooler 16 from whence it is conveyed by pumps 3a–6a to the de-superheaters. The above steam cycle from the steam receiver 8 to and including the feed heaters is an example of conventional steam turbine practice and any of the many variations of steam cycle in this part of the plant may be used.

Also shown in the conventional part of the cycle is a drain cooler 17 and air ejector 18 between the extractor pump 9a and the feed heaters. Provision is also made for a part or the whole of the steam to bypass the turbine, the steam being conveyed to a dump condenser 19 with which is associated a steam pressure reducer and de-superheater 19a for the steam prior to its being condensed. The condensate is passed via pump 20 and cooler 21 to the upstream side of the pump 9a where it rejoins the main cycle.

The presence of the dump condenser ensures that the reactor can be made substantially independent of any large fluctuation of load on the turbine and also enables the turbine to be bypassed completely if necessary.

The condensate leaving the moderator cooler 16 is split into two main streams X and Y. The first stream X enters a heat exchanger 22 where it is raised to steam at or near the saturation point. The second stream of condensate Y passes to the de-superheaters 3–6 and their associated pumps, the pumps being connected in parallel with the main feed line of the said second stream of condensate. The amount of condensate extracted by each de-superheater pump increases as the condensate passes from pump 3a to pump 6a, in other words the arrangement is such that pump 3a takes the smallest quantity, pump 4a a larger amount, pump 5a a larger amount still and the largest amount and the remaining amount of condensate is taken by pump 6a.

The reactor consists of several separate sections through which steam is circulated to cool the fuel elements located therein, the sections being connected in series so that steam flows through each section in turn from an initial section to a final section, steam passing from one section to the next flowing through a de-superheater. These sections are shown diagrammatically in FIGURE 1, but are described in detail later. The various sections are lettered in order by the reference letters A, B, C, D, E, and F respectively.

Steam at or near saturation point leaves heat exchanger 22 and enters the first section A where it is raised to superheated steam by the heat generated by the fuel elements in this section. The steam leaving section A passes through de-superheater 3 where a certain amount of condensate is mixed with it. The amount of condensate used is such that both superheated steam from section A and the condensate are converted to steam at or near the saturation point. The saturated steam then passes to section B of the reactor where it is superheated and then leaving section B passes to de-superheater 4 where further condensate is added, this time a larger amount than in de-superheater 3, and again the amount is such that superheated steam and condensate are converted to steam at or near the saturation point. The process is continued in section C and in de-superheater 5 and the saturated steam leaving the latter enters section D from which section it enters the final de-superheater 6 where the remaining condensate is added and saturated steam equivalent to the full mass flow enters section E where it is finally superheated and ready for passing to the turbine.

In the arrangement illustrated in FIGURE 1, however, a preferred arrangement is shown whereby the superheated steam from section E passes to heat exchanger 22 where it raises condensate in the first condensate path X referred to above, to steam at or near the saturation point. The cooled steam then re-enters the reactor in a section F where the heat lost in heat exchanger 22 is replaced and the superheated steam leaves section F and passes to steam receiver 8.

For starting up, an external supply 50 of heat, for example, by combustion of a fuel, is provided for heat exchanger 22 and if desired heat can continue to be supplied to the heat exchanger 22 by this method but as mentioned above the preferred method is to use superheated steam from section E.

The number of sections of the reactor can be adjusted to suit the various circumstances and the number of flow channels in each section is preferably adjusted so that the mass flow through each flow channel follows the normal mass flow distribution in conventional gas cooled reactors.

With the arrangement shown, the steam circulates through the reactor as in a normal boiler and the only circulation power required is that of the feed and extraction pumps 15 and 9a and de-superheater pumps 3a and 6a. As these are circulating water, the total circulation power required is much smaller than if the full mass flow of steam had to be pumped through the reactor as in a previous proposal.

When a liquid moderator is used as in the above example some cooling of the liquid may be desirable and this is effected in the form illustrated by circulating the liquid through the moderator cooler 16. Again as the fluid being circulated is liquid, the pumping power is relatively small as compared with gas circulation.

The moderator can be allowed to boil and be cooled by condensation in the moderator cooler 16, dissociated gases produced during radiation being removed and recombined in a recombination unit 16a in accordance with known practice with liquid moderators. A heater 16b is also provided for heating the moderator prior to its being recirculated to the reactor by pump 16c during the starting operation so as to raise the moderator to near boiling point and maintain it in this condition throughout if so desired.

If a graphite moderator is used, the necessity for cooling the moderator is obviated.

The reactor arrangement achieves the advantages of gas cooling coupled with low pumping power for the circulation of the coolant. It also avoids the capital cost of large heat exchangers for the transfer of heat from a gas to water to raise steam.

Whilst the de-superheaters have been shown outside the reactor, the invention is not limited to such an arrangement and the de-superheaters may, if circumstances permit, be arranged inside the reactor pressure vessel.

FIGURES 2, 3 and 4 show, by way of example, a suitable fuel element arrangement for a reactor of the kind described in FIGURE 1. The fuel elements are dispersed in the reactor core in groups or clusters, each of the sections A–F containing one or more clusters.

The fuel elements of each cluster are located in a series of containers which form part of a fuel element support member 23 shown in plan in FIGURE 2. Each container 24 which may be of aluminum or magnesium alloy consists of a tubular member closed at one end and the containers are joined together and maintained in fixed relation to one another by walls 25 of similar material which form a hexagon supporting the containers on the outer periphery of the cluster, and by walls 26 which support a central container. This configuration is one of many which may be adopted.

FIGURE 3 is a section on line XX of FIGURE 2 and shows that at their open ends the containers are located in a tube plate 27 by means of which the members 23 are supported in the reactor core.

FIGURE 4 shows an end view of member 23 looking in the direction of the arrow R in FIGURE 2 and shows the walls 25 in end elevation.

Located in each container 24 is a tube 28 as shown in FIGURE 5. The tube 28 which may be of aluminum or magnesium alloy is spaced from the container 24 by spacers 29. The tube 28 extends beyond the tube plate 27 to a compartment of the reactor from which steam passes to a de-superheater.

The fuel element 30 is supported for example by means of a spider within the tube 28 and in the form illustrated in FIGURES 2–4 consists of a series of straight closed tubes 31 which may be of stainless steel dispersed around the inner periphery of tube 28. The tubes 31 contain the nuclear fuel, for example, uranium oxide, and are supported by a member 32, which may be of stainless steel, which has radially extending walls 32a having slotted edges into which the tubes are fitted and supported. The radial walls are helically disposed with respect to the central axis of the element.

The form of element described is in accordance with one of the forms described in our co-pending U.S. applications 768,786 and 775,900 but it may be of an alternative form described therein or any standard type of fuel element in which the fuel is housed in a closed container. The requirement for the present invention is that the steam flowing through the inside of tube 28 can flow over the surface of the fuel element to receive heat therefrom.

The arrangement is such that steam near the saturation point passes downward between the container 24 and tube 28 and then flows upwards through the inside of tube 28 over the fuel element and thence through a continuation of tube 28 to a compartment from which it passes to a de-superheater.

The passage of the lower temperature steam between container 24 and tube 28 serves to reduce the heating of the moderator. This is particularly important where the moderator is liquid, for example, light or heavy water.

The container 24 as mentioned above may be made of aluminum alloy and in order to reduce the pressure difference across the tube the liquid moderator can be pressurized. If the liquid moderator is not pressurized, however, the tubes are designed to withstand the pressure difference involved.

In the reactor the portions of the containers 24 below tube plate 27 are located in the moderator.

The space above the tube plate 27 is divided into two separate steam spaces arranged one above the other. Each steam space is in turn divided into separate compartments such that each steam space has a compartment corresponding to sections A to F of the reactor core. If for example the core sections A to F are sector-shaped the steam spaces would be similarly divided into sector shaped compartments corresponding to section A being directly above A and so.

Considering, for the purpose of explanation, section A in the core, substantially dry saturated steam enters the corresponding compartment in the lower steam space from which it enters the space between tubes 24 and tubes 28 in each fuel channel of section A. It then flows downwards through this space then upwards over the fuel elements and thence in continuations of tubes 24 through the lower steam space into the corresponding compartment in the upper steam space from which compartment it passes to de-superheater 3.

The fuel element may be supported as previously mentioned by means of a member such as a spider fixed to the lower end of the tube 28 and in this event the fuel elements may be adapted so that two or more elements can be stacked one on top of the other in a tube 28.

Whilst the invention has been described with reference to the use of steam as a coolant, the invention is not limited to steam and other condensable vapors may be used on the same principle.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. An apparatus for supplying superheated steam from a nuclear reactor to a steam operated power plant which apparatus comprises a nuclear reactor having a core of neutron moderating material housing fuel elements, duct means for circulating steam over said fuel elements to remove heat therefrom in successive sections of the core, said sections being connected in series with one another, a plurality of desuperheaters operatively connected to said duct means between said successive sections of the core for receiving steam after it has left a section and prior to its entry into a succeeding section, desuperheater pump means coupled to each desuperheater to supply condensate thereto from the power plant for evaporation by mixing with steam in the desuperheater, means conveying superheated steam from a final section of the core to the power plant, a condenser for condensing steam exhausted from said power plant, a feed pump for conveying condensate from the condenser back to the reactor, means dividing up the condensate from the feed pump into separate streams, a heat exchanger for heating the condensate and raising it to steam, means conveying one stream of condensate to said heat exchanger and thence to a first section of the core and means conveying the other streams of condensate to the desuperheater pump means.

2. An apparatus for supplying superheated steam from a nuclear reactor to a steam operated power plant which apparatus comprises a nuclear reactor having a core of liquid moderating material housing fuel elements, duct means for circulating steam over said fuel elements to remove heat therefrom in successive sections of the core said sections being connected in series with one another, a plurality of desuperheaters operatively connected to said duct means between said successive sections of the core for receiving steam after it has left a section and prior to its entry into a succeeding section, desuperheater pump means coupled to each desuperheater to supply condensate thereto from the power plant for evaporation by mixing with steam in the desuperheater, means conveying superheated steam from a final section of the core to the power plant, a condenser for condensing steam exhausted from said power plant, a feed pump for conveying condensate from the condenser back to the reactor, a cooler for the liquid moderator, means circulating the liquid moderator through said cooler and back to the reactor, means conveying condensate from said feed pump through the cooler to cool said moderator, means dividing up condensate leaving the cooler into separate streams, a heat exchanger for heating the condensate and raising it to steam, means conveying one stream of condensate to said heat exchanger and thence to a first section of the core and means conveying the other streams of condensate to the desuperheater pump means.

3. A method of operating a power plant by utilizing a a nuclear reactor with a reactor core comprising nuclear fuel housed in closed containers located in a liquid neutron moderating material, steam being raised in the reactor core and circulated to the power plant for consumption therein, the steam being condensed and returned to the reactor, comprising the steps of dividing the condensate returning to the reactor from the power plant into a number of separate streams, raising one stream to saturated steam outside the reactor, passing the said stream through successive sections in series of the reactor core where it is superheated, passing steam from one section through a de-superheater before passing it to the next section, conveying the remaining streams of condensate to the de-superheater, mixing the condensate in the de-superheaters with steam passing therethrough between successive sections of the reactor to cool the steam and convert the condensate to steam and adding increased amounts of condensate in successive de-superheaters until the steam returning to the reactor from the final de-superheater is equivalent to the full mass flow of steam circulated to the power plant.

4. The method as in claim 3, but further characterized by circulating the liquid moderator through a cooler located outside the reactor through which condensate being returned to the reactor is circulated, and pressurizing the liquid moderator in the reactor.

5. A method of operating a steam power plant utilizing heat removed from the reactor core of a nuclear reactor to raise steam which is circulated to the power plant condensed and returned to the reactor comprising the steps of dividing the condensate returning to the reactor from the power plant into a number of separate streams raising one stream to saturated steam outside the reactor, passing said stream through successive sections in series of the reactor core where it is superheated, passing steam from one section through a de-superheater before passing it to the next section, conveying the remaining streams of condensate to the de-superheaters, mixing the condensate in the de-superheaters with steam passing therethrough between successive sections of the reactor to cool the steam and convert the condensate to steam and adding increasing amounts of condensate in successive de-superheaters until the steam returning to the reactor from the final de-superheater is equivalent to the full mass flow of steam circulated to the power plant.

6. The method as in claim 5, but further characterized by conveying the steam leaving the section of the reactor following from the final de-superheater to a heat exchanger to heat the stream of condensate entering the first section of the reactor, returning the steam from the heat exchanger to a final section of the reactor for further heating, and conveying the heated steam to the power plant.

References Cited in the file of this patent

FOREIGN PATENTS

| | | |
|---|---|---|
| 1,141,064 | France | Mar. 11, 1957 |
| 797,725 | Great Britain | July 9, 1958 |
| 1,039,147 | Germany | Sept. 18, 1958 |
| 1,039,659 | Germany | Sept. 25, 1958 |
| 1,186,326 | France | Feb. 23, 1959 |
| 1,051,425 | Germany | Feb. 26, 1959 |

OTHER REFERENCES

Proceedings of the Second United Nations International Conference on the Peaceful Uses of Atomic Energy, held in Geneva (Sept. 1–Sept. 13, 1958; vol. 9 United Nations, Geneva), 1958.